Patented Dec. 26, 1922.

1,440,006

UNITED STATES PATENT OFFICE.

HENRY DREYFUS, OF LONDON, ENGLAND.

CELLULOSE ACETATE COMPOSITION.

No Drawing.   Application filed September 21, 1922. Serial No. 589,692.

*To all whom it may concern:*

Be it known that I, HENRY DREYFUS, a citizen of the Swiss Republic, of London, England, have invented certain new and useful Improvements in or Relating to Cellulose Acetate Compositions, of which the following is a specification.

This invention relates to the manufacture of solutions, varnishes, celluloid-like products, plastic masses, artificial silk, or other products, preparations, or articles made with cellulose acetates. Any such solutions, preparations and products are hereinafter included in the term "composition of matter." The invention is characterized by the employment of cyclobutanones, that is to say ketotetramethylene and its side chain homologues, such as dimethyl or diethyl cyclobutanone, as solvents of cellulose acetates in the manufacture of such solutions, products, preparations or articles.

I have found especially that cyclobutanone is an excellent solvent for cellulose acetates. This substance which is represented by the formula

boils at about 99–101° C. It has a very great solvent power for cellulose acetates, and is a better solvent for the same than cyclohexanone.

The cyclobutanone or side chain homologues thereof may be employed in any desired quantity relatively to the cellulose acetate, either alone or together with any known or suitable diluents or solvents, such as methyl alcohol, ethyl alcohol, acetone, methyl acetate, alcohol-benzol mixture and so forth. Any other usual or suitable substances, such for instance as plasticizing agents, camphor substitutes, filling substances, colouring matters and so forth, may be added or employed in making the solutions, plastic masses, compositions, films, artificial silk, or other products according to the particular object in view.

The following examples will serve to illustrate some practical applications of the invention, it being understood that they are only illustrative and can be varied widely.

*Example 1.*

For a solution or varnish—

| | Parts. |
|---|---|
| Cellulose acetate | 100 |
| Cyclobutanone | 1000 | or

| | |
|---|---|
| Cellulose acetate | 100 |
| Cyclobutanone | 100–500 |
| Methyl acetate or acetone | 900–500 |

*Example 2.*

For a plastic or celluloid-like mass—

| | Parts. |
|---|---|
| Cellulose acetate | 100 |
| Cyclobutanone | 50 |
| Methyl acetate, acetone or alcohol | 100 |
| Triphenylphosphate | 12–15 |

More or less of the solvents may be employed in these examples, according to requirements.

In the appended claims the expression "a ketotetramethylene compound" is intended to cover cyclobutanone and its side chain homologues.

What I claim and desire to secure by Letters Patent is:—

1. A composition of matter containing cellulose acetate and a ketotetramethylene compound.

2. A composition of matter containing cellulose acetate and cyclobutanone.

3. A composition of matter containing cellulose acetate, a ketotetramethylene compound and a plasticizing agent.

In testimony whereof I have hereunto subscribed my name.

HENRY DREYFUS.